(12) United States Patent
Yasuda et al.

(10) Patent No.: US 8,983,245 B2
(45) Date of Patent: Mar. 17, 2015

(54) OPTICAL BOARD, METHOD OF MANUFACTURING THE OPTICAL BOARD AND OPTICAL MODULE STRUCTURE

(71) Applicant: Hitachi Cable, Ltd., Tokyo (JP)

(72) Inventors: Hiroki Yasuda, Mito (JP); Hiroshi Ishikawa, Hitachi (JP); Kouki Hirano, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 22 days.

(21) Appl. No.: 13/780,798

(22) Filed: Feb. 28, 2013

(65) Prior Publication Data

US 2014/0105536 A1   Apr. 17, 2014

(30) Foreign Application Priority Data

Oct. 12, 2012   (JP) ................................ 2012-226825

(51) Int. Cl.
| | |
|---|---|
| *G02B 6/26* | (2006.01) |
| *G02B 6/12* | (2006.01) |
| *G02B 6/42* | (2006.01) |
| *G02B 6/38* | (2006.01) |
| *G02B 6/13* | (2006.01) |

(52) U.S. Cl.
CPC .. *G02B 6/13* (2013.01); *G02B 6/12* (2013.01); *G02B 6/428* (2013.01); *G02B 6/4214* (2013.01)
USPC ................... 385/18; 385/14; 385/38; 385/47; 385/65

(58) Field of Classification Search
CPC .... G02B 6/3512; G02B 6/4214; G02B 6/352; G02B 6/2817
USPC ............ 385/14, 38, 47, 49, 52, 88, 89, 18, 65
See application file for complete search history.

(56) References Cited

U.S. PATENT DOCUMENTS

| | | | |
|---|---|---|---|
| 5,071,213 A * | 12/1991 | Chan ............................... | 385/52 |
| 6,947,645 B2 | 9/2005 | Korenaga et al. | |
| 2003/0118288 A1 | 6/2003 | Korenaga et al. | |
| 2009/0285580 A1* | 11/2009 | Yasuda et al. ................. | 398/139 |
| 2011/0052205 A1* | 3/2011 | Yu et al. ........................ | 398/142 |
| 2012/0213470 A1* | 8/2012 | Matsuoka et al. .............. | 385/14 |

FOREIGN PATENT DOCUMENTS

JP    2003167175 A    6/2003

* cited by examiner

*Primary Examiner* — Kaveh Kianni
*Assistant Examiner* — Hung Lam
(74) *Attorney, Agent, or Firm* — Roberts Mlotkowski Safran & Cole P.C.

(57) ABSTRACT

An optical board includes a plate-shaped resin base material including a slit-shaped optical fiber housing portion formed thereon, a metal layer formed on a surface of the based material, and a reflective layer for reflecting light propagating in an optical fiber housed in the optical fiber housing portion. The base material further includes an inclined surface inclined with respect to the surface of the base material at a terminal end of the optical fiber housing portion. The reflective layer is formed over an end face of the metal layer and the inclined surface, the end face forming a flat surface continuously with the inclined surface.

14 Claims, 4 Drawing Sheets

OPTICAL BOARD, METHOD OF MANUFACTURING THE OPTICAL BOARD AND OPTICAL MODULE STRUCTURE

The present application is based on Japanese patent application No. 2012-226825 filed on Oct. 12, 2012, the entire contents of which are incorporated herein by reference.

BACKGROUND OF THE INVENTION

1. Field of the Invention

The invention relates to an optical board for housing an optical fiber, a method of manufacturing the optical board and an optical module structure having the optical board.

2. Description of the Related Art

A conventional optical component mounting substrate having a groove for holding an optical fiber and mounting a photoelectric conversion element is known (see JP-A-2003-167175).

By pressing a molding die having a triangular prism-shaped protrusion against a substrate material softened by heating at high temperature, a guide groove having a shape corresponding to the protrusion of the molding die and a tapered surface at an end portion of the guide groove are formed on the optical component mounting substrate disclosed in JP-A-2003-167175. A reflecting surface is formed on the tapered surface by plating a metal layer or attaching a mirror, and light emitted from an optical fiber held in the guide groove is reflected toward a light-receiving element by the reflecting surface.

SUMMARY OF THE INVENTION

With the increase in integration density of components of electronic devices such as information-processing device or communication device in recent years, the optical component mounting substrate is also required to be thinned. The demand of thin substrate is increasing more and more, and it is required to thin a substrate to, e.g., a thickness equivalent to a diameter of an optical fiber.

If the substrate is thinned in the structure of the optical component mounting substrate disclosed in JP-A-2003-167175 in which the tapered surface formed at the end portion of the guide groove is formed as the reflecting surface, the reflecting surface area is narrowed and it is difficult to sufficiently reflect light emitted and diffused from the core of the optical fiber toward the light-receiving element.

Accordingly, it is an object of the invention to provide an optical board allowing a light reflecting area to be surely provided even when a base material is thinned, a method of manufacturing the optical board and an optical module structure.

According to one embodiment of the invention, an optical board comprises:

a plate-shaped resin base material comprising a slit-shaped optical fiber housing portion formed thereon;

a metal layer formed on a surface of the based material; and a reflective layer for reflecting light propagating in an optical fiber housed in the optical fiber housing portion, wherein the base material further comprises an inclined surface inclined with respect to the surface of the base material at a terminal end of the optical fiber housing portion, and wherein the reflective layer is formed over an end face of the metal layer and the inclined surface, the end face forming a flat surface continuously with the inclined surface.

According to another embodiment of the invention, an optical module structure comprises:

the optical board according to the above embodiment; and a photoelectric conversion element for conversion between an electrical signal and an optical signal transmitted through the optical fiber as a transmission medium.

According to another embodiment of the invention, a method of manufacturing an optical board comprises:

forming a first metal layer on a surface of a plate-shaped resin base material;

removing a portion of the base material together with the first metal layer on the surface thereof so as to form a slit-shaped optical fiber housing portion on the base material; and forming a reflective layer on an end face of the first metal layer and an inclined surface at a terminal end of the optical fiber housing portion that are formed by the removing.

Points of the Invention

According to one embodiment of the invention, an optical board is constructed such that a reflective layer is formed over an inclined surface of a base material and an end face of a first metal layer. Thereby, it is possible to surely provide an area of a reflective portion for reflecting light even when the optical board is thinned to a thickness equivalent to a diameter of the optical fiber.

BRIEF DESCRIPTION OF THE DRAWINGS

Next, the present invention will be explained in more detail in conjunction with appended drawings, wherein:

FIGS. 1A and 1B show an optical board and a structural example of an optical module structure provided with the optical board in an embodiment of the present invention, wherein FIG. 1A is a plan view and FIG. 1B is a side view;

DETAILED DESCRIPTION OF THE PREFERRED EMBODIMENTS

Embodiment

Figure 1A:
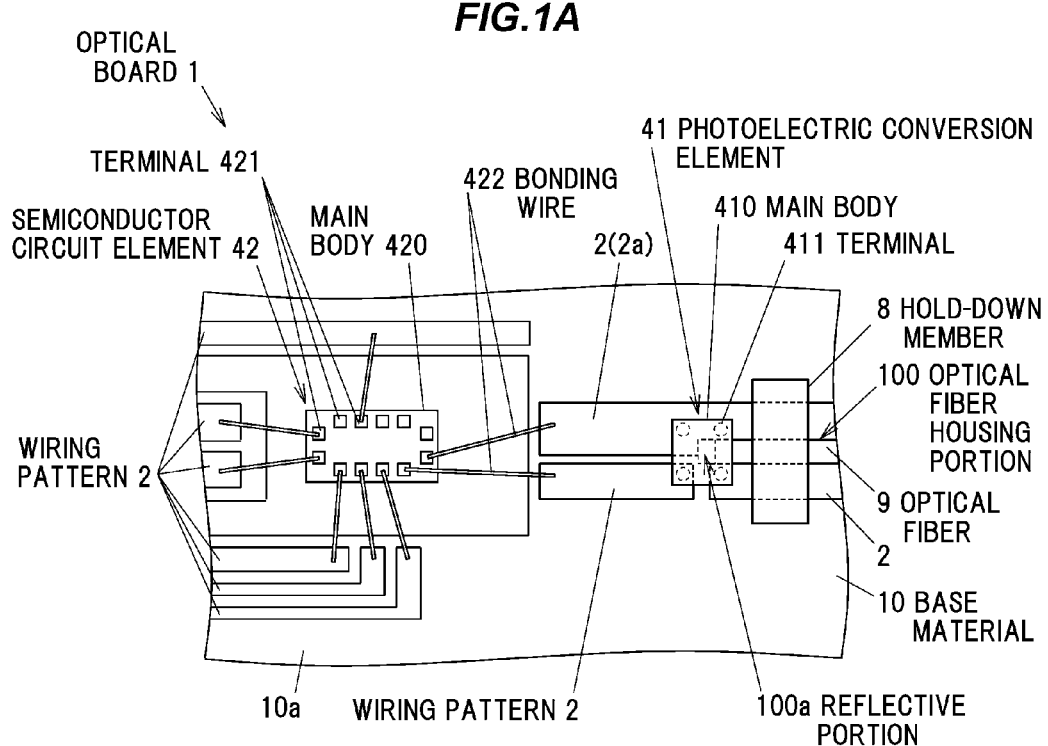
Figure 1B:
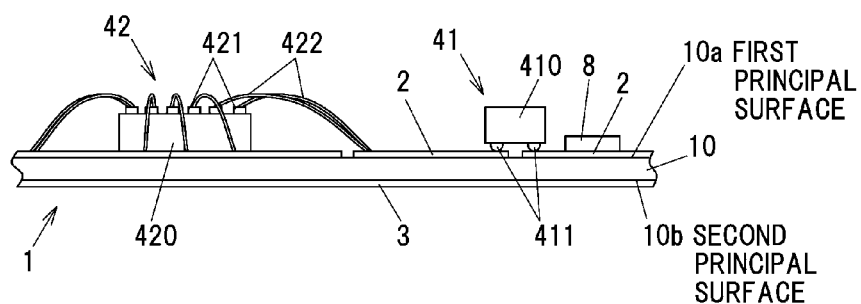

FIGS. 1A and 1B show an essential part of an optical board and a structural example of an optical module structure provided with the optical board in an embodiment of the invention, wherein FIG. 1A is a plan view and FIG. 1B is a side view.

An optical board 1 is provided with a plate-shaped base material 10 having a first principal surface 10a (front surface) and a second principal surface 10b (back surface) opposite thereto. The base material 10 is formed of an insulating resin such as polyimide. The first principal surface 10a and the second principal surface 10b are parallel to each other and the base material 10 has a thickness of, e.g., 70 μm. FIG. 1A shows the optical board 1 as viewed from the first principal surface 10a side.

In addition, the base material 10 is provided with plural wiring patterns 2 made of a conductive metal layer formed on the first principal surface 10a as a front surface of the base material 10, and a conductive back-side metal layer 3 formed on the second principal surface 10b. In the present embodiment, the back-side metal layer 3 is provided on the entire second principal surface 10b. The back-side metal layer 3 is composed of a foundation metal layer 31, a Ni plating layer 32 and an Au plating layer 33 formed thereon (see FIG. 4), as described later. A surface of the resin base material 10 is exposed between the plural wiring patterns 2. Note that, the wiring patterns 2 under below-described photoelectric conversion element 41 and hold-down member 8 are indicated by a dashed line in FIG. 1A.

In addition, a slit-shaped optical fiber housing portion 100 is formed on the base material 10 so as to penetrate the base material 10 in a thickness direction from the first principal surface 10a to the second principal surface 10b and to extend parallel to the first principal surface 10a and the second principal surface 10b. A reflective portion 100a for reflecting light propagating in an optical fiber 9 as a transmission medium is formed at an end (terminal end) of the optical fiber housing portion 100. A detailed structure of the reflective portion 100a will be described later.

The optical fiber 9 is housed in the optical fiber housing portion 100. The optical fiber 9 is held by the plate-shaped hold-down member 8 attached on the first principal surface 10a so as not to slip out from the optical fiber housing portion 100.

On the first principal surface 10a side of the optical board 1, the photoelectric conversion element 41 and a semiconductor circuit element 42 electrically connected thereto are mounted on the wiring patterns 2. The photoelectric conversion element 41 is an element which converts an electrical signal into an optical signal or an optical signal into an electrical signal. An example of the former includes a light-emitting element such as semiconductor laser element or LED (Light Emitting Diode). Meanwhile, an example of the latter includes a light-receiving element such as photodiode. The photoelectric conversion element 41 is configured such that light vertical to the base material 10 exits from or is incident on a light emitting/receiving portion 410a (see FIG. 4) formed on the base material 10 side.

When the photoelectric conversion element 41 is an element which converts an electrical signal into an optical signal, the semiconductor circuit element 42 is a driver IC for driving the photoelectric conversion element 41. On the other hand, when the photoelectric conversion element 41 is an element which converts an optical signal into an electrical signal, the semiconductor circuit element 42 is a receiver IC for amplifying a signal which is input from the photoelectric conversion element 41.

In the present embodiment, the photoelectric conversion element 41 is flip-chip-mounted and has four terminals (bumps) 411 provided on a main body 410. The four terminals 411 are respectively connected to the wiring patterns 2. In addition, the photoelectric conversion element 41 is mounted at a position where the main body 410 faces the reflective portion 100a.

When the photoelectric conversion element 41 is an element which converts an electrical signal into an optical signal, the reflective portion 100a reflects light emitted from the photoelectric conversion element 41 toward an end face of the optical fiber 9. On the other hand, when the photoelectric conversion element 41 is an element which converts an optical signal into an electrical signal, the reflective portion 100a reflects light emitted from the optical fiber 9 toward the photoelectric conversion element 41.

In the semiconductor circuit element 42, plural (twelve in the example shown in FIG. 1A) terminals (electrode pads) 421 are provided on a main body 420 on a side opposite to a surface facing the wiring pattern 2. The respective terminals 421 are electrically connected to the wiring patterns 2 by bonding wires 422. In addition, some of the plural terminals 421 are connected to the wiring patterns 2 to which the terminals 411 of the photoelectric conversion element 41 are connected, thereby electrically connecting the semiconductor circuit element 42 to the photoelectric conversion element 41.

In addition to the photoelectric conversion element 41 and the semiconductor circuit element 42, it is possible to mount a connector, an IC (Integrated Circuit) or electronic components such as active device (transistor, etc.) or passive device (resistor or capacitor, etc.) on the optical board 1 even though illustration is omitted in FIGS. 1A and 1B.

Next, a method of manufacturing the optical board 1 will be described in reference to FIGS. 2A to 3C. FIGS. 2A to 2D are cross sectional views showing a formation process of the reflective portion 100a of the optical board 1 and a periphery thereof. FIGS. 3A to 3C are plan views showing a formation process of the reflective portion 100a and a periphery thereof when the optical board 1 is viewed from the first principal surface 10a side as a front surface.

A process of manufacturing the optical board 1 includes at least a step of forming a first metal layer 21 on the first principal surface 10a of the base material 10 as well as forming the foundation metal layer 31 on the second principal surface 10b, a step of removing a portion of the base material 10, together with the first metal layer 21, by irradiating a laser beam L at an angle inclined with respect to the first principal surface 10a of the base material 10 to form the slit-shaped optical fiber housing portion 100 on the base material 10, and a step of forming a reflective layer 102 on an end face 210 of the first metal layer 21 and an inclined surface 101 at a terminal end of the optical fiber housing portion 100 which are formed by irradiating the laser beam L.

The present embodiment further includes a step in which nickel (Ni) plating and gold (Au) plating are applied to a second metal layer 22 which is, as described later, formed on the first metal layer 21, the end face 210 and the inclined surface 101, and the foundation metal layer 31 which is formed on the second principal surface 10b side. First to fifth steps of the process of manufacturing the optical fiber housing portion 100 will be described in more detail below.

Figure 2A:
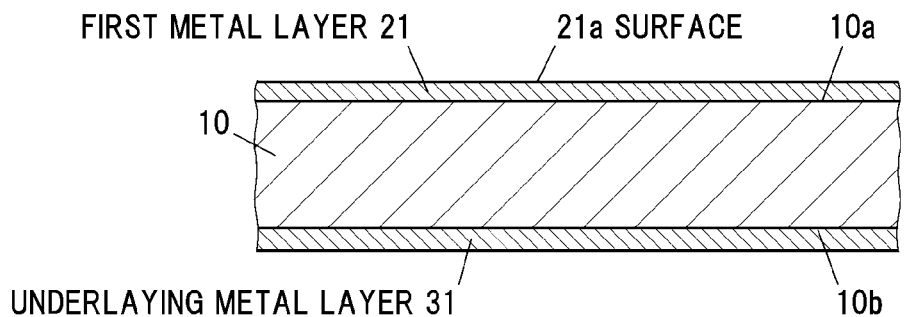
FIGS. 2A to 2D are cross sectional views showing a formation process of a reflective portion of the optical board and a periphery thereof.
Figure 3A:
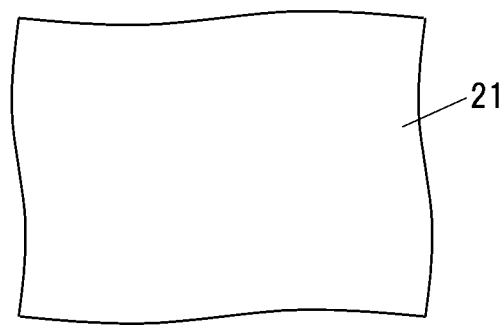
FIGS. 3A to 3C are plan views showing a formation process of the reflective portion and a periphery thereof when the optical board is viewed from a first principal surface side as a front surface.
Figure 3B:
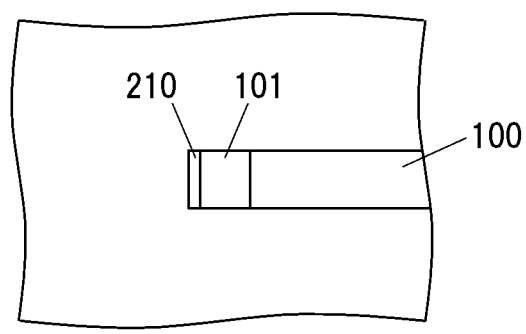
Figure 3C:
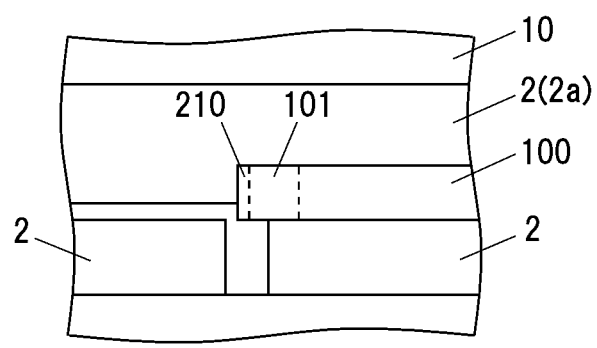

In the first step, the first metal layer 21 is formed on the entire first principal surface 10a of the base material 10 and the foundation metal layer 31 is formed on the entire second principal surface 10b respectively by, e.g., adhesion, deposition or non-electrolytic plating, as shown in FIGS. 2A and 3A. In the present embodiment, the first metal layer 21 and the foundation metal layer 31 consist mainly of copper (Cu) which is a good conductor. Although the foundation metal layer 31 is formed thicker than the first metal layer 21 in the present embodiment, the thicknesses thereof may be the same.

Figure 2B:
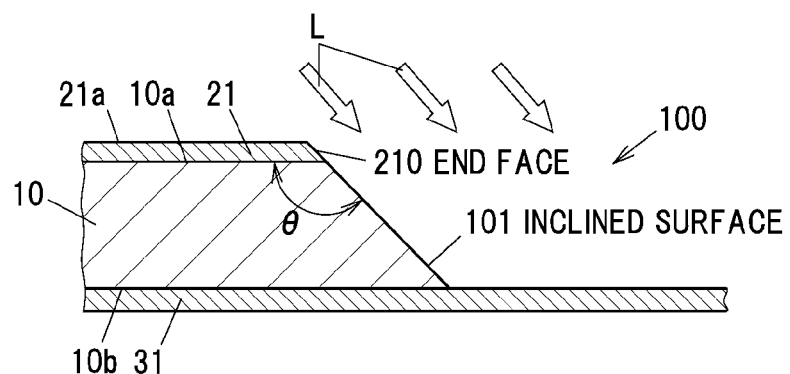

In the second step, the laser beam L is obliquely irradiated onto the first principal surface 10a from the first metal layer 21 side, as shown in FIG. 2B. In more detail, it is possible to use, e.g., excimer laser or UV laser (ultraviolet laser) as the laser beam L. By the irradiation of the laser beam L, the end face 210 is formed on the first metal layer 21, and the optical fiber housing portion 100 and the inclined surface 101 at the terminal end thereof are formed on the base material 10, as shown in FIGS. 2B and 3B. Irradiation time of the laser beam L is determined such that the first metal layer 21 and the base material 10 are carved (removed by light irradiation) but the foundation metal layer 31 is not completely removed.

The end face 210 and the inclined surface 101 are formed along the direction of the laser beam L. In addition, the end face 210 is a flat surface formed continuously with the inclined surface 101. In other words, the end face 210 and the inclined surface 101 are formed as a continuous flat surface.

In the present embodiment, by irradiating the laser beam L from the first metal layer 21 side, the end face 210 is formed on the first metal layer 21 and, at the same time, the inclined surface 101 is formed on the base material 10. In more detail, when an angle of the inclined surface 101 to be formed on the base material 10 with respect to the first principal surface 10a is defined as an angle θ, the end face 210 and the inclined surface 101 are formed by irradiating the laser beam L from the first metal layer 21 side at an angle corresponding to the angle θ (at an irradiation angle with respect to the first principal surface 10a which coincides with the angle θ). The angle θ is an obtuse angle (θ>90°), and is 135° in the example shown in FIG. 2B. In this case, an angle formed by the inclined surface 101 and the second principal surface 10b is 45°.

In addition, the foundation metal layer 31 on the second principal surface 10b remains without being completely removed by the irradiation of the laser beam L, and serves as a bottom surface of the optical fiber housing portion 100. The foundation metal layer 31 supports the optical fiber 9 (shown in FIG. 1A) from the second principal surface 10b side.

Figure 2C:
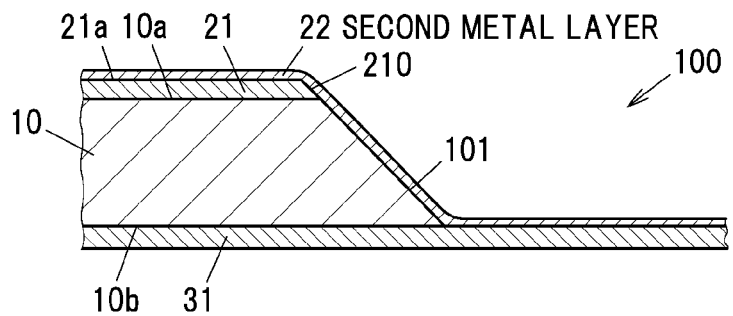

In the third step, the second metal layer 22 is formed over the inclined surface 101 formed on the base material 10 in the second step, a surface 21a of the first metal layer 21 formed on the first principal surface 10a and the end face 210 of the first metal layer 21, as shown in FIG. 2C. In the present embodiment, the second metal layer 22 consists mainly of copper (Cu) and is formed on the surface 21a and the end face 210 of the first metal layer 21 and the inclined surface 101 by, e.g., non-electrolytic plating. In addition, the second metal layer 22 is also formed on one surface of the foundation metal layer 31 (a surface on the second principal surface 10b side) in the optical fiber housing portion 100.

In the fourth step, the plural wiring patterns 2 are formed on the first principal surface 10a by partially etching the first and second metal layers 21 and 22, as shown in FIG. 3C. In more detail, a resist film is formed on the second metal layer 22 except a portion where the first metal layer 21 and the second metal layer 22 are to be removed, and the portions of the first metal layer 21 and the second metal layer 22 on which the resist film is not formed are dissolved by etching. The resist film is formed also on the second metal layer 22 which is formed on the end face 210 of the first metal layer 21 and the inclined surface 101, and thus, the second metal layer 22 on the end face 210 and the inclined surface 101 remains without being removed.

Figure 2D:
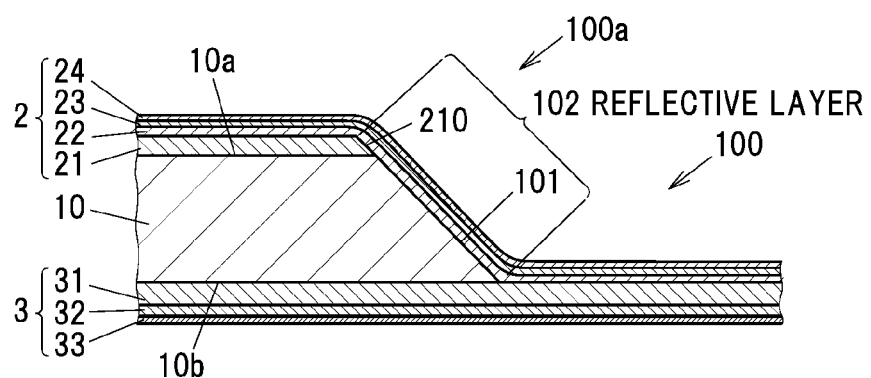

In the fifth step, Ni plating layers 23 and 32 are formed by applying nickel (Ni) plating onto the second metal layer 22 remained without being removed by etching in the fourth step and onto the foundation metal layer 31 formed on the second principal surface 10b, and Au plating layers 24 and 33 are further formed by applying gold (Au) plating onto the Ni plating layers 23 and 32, as shown in FIG. 2D. The nickel plating and the gold plating are applied by, e.g., non-electrolytic plating.

Through the above-mentioned first to fifth steps, the wiring pattern 2 formed of a metal layer having a four-layer structure composed of the first metal layer 21, the second metal layer 22, the Ni plating layer 23 and the Au plating layer 24 is formed on the first principal surface 10a of the base material 10. The total thickness of the first and second metal layers 21 and 22 is, e.g., 5 to 25 μm, a thickness of the Ni plating layer 23 is, e.g., not more than 15 μm and a thickness of the Au plating layer 24 is, e.g., 0.03 to 0.5 μm.

Meanwhile, the reflective layer 102 having a three-metal-layer structure composed of the second metal layer 22, the Ni plating layer 23 and the Au plating layer 24 is formed on the end face 210 of the first metal layer 21 and the inclined surface 101. In other words, the reflective portion 100a is composed of the reflective layer 102 which is formed over the end face 210 of the first metal layer 21 and the inclined surface 101.

The reflective layer 102 is a metal layer formed in the three to fifth steps. The wiring pattern 2 and the reflective layer 102 have the same layer structure except that the wiring pattern 2 has the first metal layer 21 as the lowermost layer. In addition, the outermost surfaces of the wiring pattern 2 and the reflective layer 102 are both plated with gold (the Au plating layer 24).

Meanwhile, the back-side metal layer 3 having a three-metal-layer structure composed of the foundation metal layer 31, the Ni plating layer 32 and the Au plating layer 33 is formed on the second principal surface 10b of the base material 10. Since the second metal layer 22 on the wiring pattern 2 and the reflective layer 102 is formed also on the foundation metal layer 31 of the back-side metal layer 3 in the optical fiber housing portion 100, the wiring pattern 2 formed continuously with the reflective layer 102 is electrically connected to the back-side metal layer 3 by the reflective layer 102.

In the present embodiment, the wiring pattern 2 formed continuously with the reflective layer 102 is a ground pattern 2a (see FIG. 1A) which is at ground potential, and potential of the back-side metal layer 3 is thus ground potential. This stabilizes behavior of electronic components mounted on the first principal surface 10a side of the base material 10, and also, a GND terminal of a non-illustrated IC mounted on the first principal surface 10a side is easily connected (grounded) to the ground potential by forming a though-hole on the base material 10.

Figure 4:
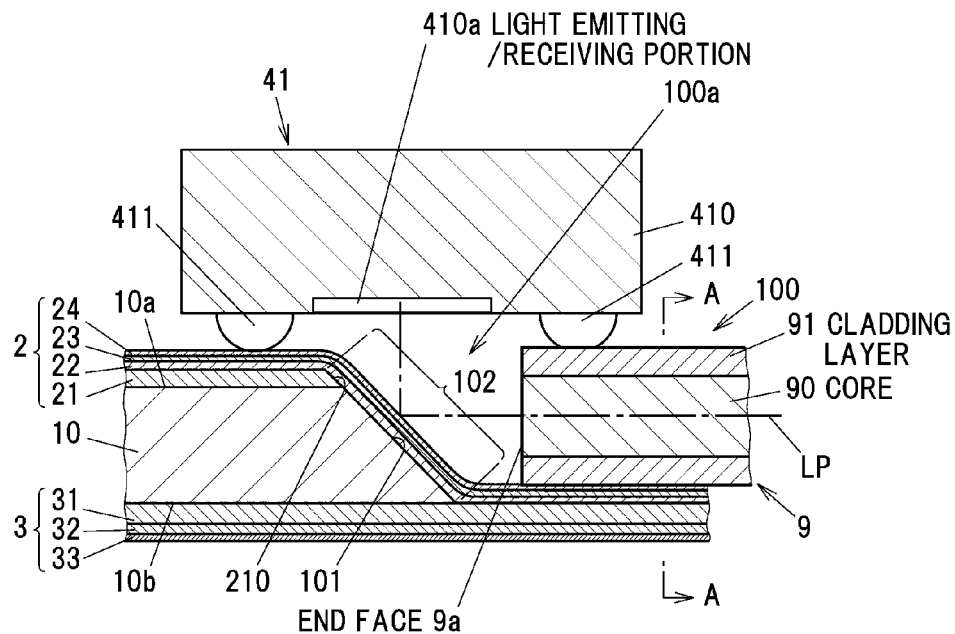
FIG. 4 is a cross sectional view showing an example of an optical module structure in the embodiment of the invention.

FIG. 4 is a cross sectional view showing an example of an optical module structure in the embodiment of the invention. The optical module structure is provided with the optical board 1 and the photoelectric conversion element 41. The photoelectric conversion element 41 is mounted on the first principal surface 10a of the base material 10 so as to cover the first metal layer 21 from the surface 21a side.

An end portion of the optical fiber 9 is housed in the optical fiber housing portion 100 so that an end face 9a thereof faces the reflective layer 102. The optical fiber 9 has a tubular cladding layer 91 on an outer periphery of a core 90. In FIG. 4, a light path LP of the light transmitted through the optical fiber 9 as a transmission medium is indicated by a dashed line.

When light is emitted from the optical fiber 9 (the core 90), the reflective layer 102 reflects the emitted light toward the first principal surface 10a side. When the photoelectric conversion element 41 is a light-receiving element, the light reflected by the reflective layer 102 is incident on the photoelectric conversion element 41 through the light emitting/receiving portion 410a provided on the main body 410 of the photoelectric conversion element 41, and an optical signal according to the incident light is converted into an electrical signal by the photoelectric conversion element 41.

On the other hand, when the photoelectric conversion element 41 is a light-emitting element, the photoelectric conversion element 41 converts an electrical signal supplied from the semiconductor circuit element 42 into an optical signal and emits light representing the optical signal from the light emitting/receiving portion 410a. The emitted light is reflected by the reflective layer 102, is then incident on the core 90 of the optical fiber 9 and propagates in the optical fiber 9.

Functions and Effects of the Embodiment

Following functions and effects are obtained by the embodiment.

(1) Since the reflective layer 102 is formed over the inclined surface 101 of the base material 10 and the end face 210 of the first metal layer 21, it is possible to surely provide an area of the reflective portion 100a for reflecting light even when the optical board 1 is thinned to a thickness equivalent to a diameter of the optical fiber 9 (e.g., the thickness of the optical board 1 is within ±20% of the diameter of the optical fiber 9).

(2) Since the end face 210 of the first metal layer 21 and the inclined surface 101 of the base material 10 form a continuous flat surface, it is possible to accurately reflect the light emitted and diffused from the photoelectric conversion element 41 toward the optical fiber 9 or the light emitted and diffused from the optical fiber 9 toward the photoelectric conversion element 41.

(3) The optical fiber housing portion 100 is formed by irradiating the laser beam L from the first metal layer 21 side at an angle corresponding to the angle θ of the inclined surface 101 with respect to the first principal surface 10a of the base material 10. Therefore, it is possible to form the optical fiber housing portion 100 and the inclined surface 101 on the base material 10 without using, e.g., a molding die, and it is also unnecessary to heat the base material 10. This leads to reduction of the manufacturing cost.

(4) Since the outermost layers of the wiring pattern 2 and the reflective layer 102 are plated with gold, a decrease in reflectivity of the reflective layer 102 caused by corrosion can be suppressed and it is possible to provide good electrical connection between the wiring pattern 2 and the photoelectric conversion element 41.

(5) Since the reflective layer 102 is conductive and is formed continuously with the wiring pattern 2, it is possible to electrically connect the wiring pattern 2 to the back-side metal layer 3 without providing, e.g., a through-hole on the base material 10.

(6) The layers composing the reflective layer 102 are formed on the end face 210 of the first metal layer 21 and on the inclined surface 101 of the base material 10 in the step of forming the wiring pattern 2. That is, a special step for forming the reflective layer 102 is not required, and accordingly, it is possible to reduce time for manufacturing the optical board 1 and to reduce the manufacturing cost.

Modification

Meanwhile, the optical board 1 in the first embodiment can be modified and implemented, e.g., as follows.

Figure 5:
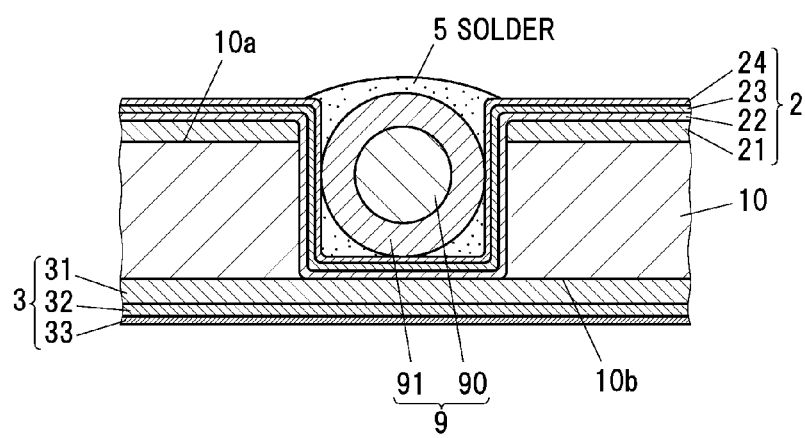
FIG. 5 is a cross sectional view taken on line A-A in FIG. 4, showing an example of an optical module structure in a modification of the embodiment.

FIG. 5 shows an example of an optical module structure in a modification of the first embodiment, and is a cross sectional view taken on line A-A in FIG. 4 showing a state in which the optical fiber 9 is fixed inside the optical fiber housing portion 100.

The optical module structure in the present modification has the same structure as the optical module structure in the first embodiment except a method of fixing the optical fiber 9. Therefore, the members having the same functions as those of the optical module structure in the first embodiment are denoted by the same reference numerals and the overlapping explanation thereof will be omitted.

In the present modification, the optical fiber 9 is fixed to the optical fiber housing portion 100 by a solder 5 without using the hold-down member 8. In more detail, the solder 5, which adheres to portions of the first principal surface 10a of the base material 10 sandwiching the optical fiber housing portion 100 and to the outermost surface of the metal layer (in detail, the Au plating layer 24) formed throughout the inner surface of the optical fiber housing portion 100, fixes the optical fiber 9 inside the optical fiber housing portion 100. In this regard, the solder 5 needs to adhere to at least the Au plating layer 24 formed on the portions of the first principal surface 10a of the base material 10 sandwiching the optical fiber housing portion 100 so that the opening of the optical fiber housing portion 100 on the first principal surface side is sealed.

In case of this modification, it is possible to fix the optical fiber 9 during the step of manufacturing the optical board 1 without necessity of preparing the hold-down member 8.

Summary of the Embodiments

Next, the technical idea understood from the embodiment will be described using the reference numerals, etc., in the embodiment. The reference numerals, etc., in the following description are not intended to limit the constituent elements in the scope of claims to the members, etc., specifically described in the embodiment.

[1] An optical board (1) comprising a plate-shaped resin base material (10) having a slit-shaped optical fiber housing portion (100) formed thereon, a first metal layer 21 formed on a first principal surface (10a) as a front surface of the base material (10) and a reflective layer (102) for reflecting light propagating in an optical fiber (9) housed in the optical fiber housing portion (100), wherein an inclined surface (101) inclined with respect to the first principal surface (10a) is formed on the base material (10) at a terminal end of the optical fiber housing portion (100), and the reflective layer (102) is formed over an end face (210) of the first metal layer (21) and the inclined surface (101), the end face (210) being a flat surface formed continuously with the inclined surface (101).

[2] The optical board (1) described in [1], wherein the optical fiber housing portion (100) is formed by irradiating a laser beam (L) from the first metal layer (21) side at an angle corresponding to an inclination angle θ of the inclined surface (101) with respect to the first principal surface (10a) of the base material (10).

[3] The optical board (1) described in [2], wherein the outermost surface of the reflective layer (102) is plated with gold (Au).

[4] The optical board (1) described in any one of [1] to [3], further comprising a wiring pattern (2) comprising a metal and formed on the first principal surface (10a) and a back-side metal layer (3) formed on a second principal surface (10b) as a back surface of the base material (10), wherein the wiring pattern (2) and the back-side metal layer (3) are electrically connected by the reflective layer (102).

[5] The optical board (1) described in any one of [1] to [4], wherein the optical fiber (9) is fixed inside the optical fiber housing portion (100) by a solder (5).

[6] An optical module structure, comprising the optical board (1) described in any one or [1] to [5] and a photoelectric conversion element (41) for conversion between electrical and optical signals transmitted through the optical fiber (9) as a transmission medium.

[7] A method of manufacturing an optical board (1), comprising a step of forming a first metal layer (21) on a first principal surface (10a) as a front surface of a plate-shaped resin base material (10), a step of removing a portion of the base material (10), together with the first metal layer (21) on the first principal surface (10a), by irradiating a laser beam (L) at an angle inclined with respect to the first principal surface (10a) of the base material (10) to form a slit-shaped optical fiber housing portion (100) on the base material (10), and a step of forming a reflective layer (102) on an end face (210) of the first metal layer (21) and an inclined surface (101) at a terminal end of the optical fiber housing portion (100) that are formed by the irradiation of the laser beam (L).

[8] The method described in [7], further comprising a step of forming a second metal layer (22) on the first metal layer (21) and the inclined surface (101) after the step of forming the optical fiber housing portion (100), and a step of forming a wiring pattern (2) on the first principal surface (10a) by partially etching the first and second metal layers (21, 22).

[9] The method described in [7] or [8], wherein the step of forming the end face (210) of the first metal layer (21) and the inclined surface (101) by the irradiation of the laser beam (L) is a step of vertically irradiating the laser beam (L) onto the first principal surface (10a) of the base material (10) using a shadow mask of which permeability to laser beam (L) is adjusted.

[10] The method described in any one of [7] to [9], wherein the step of forming the end face (210) of the first metal layer (21) and the inclined surface (101) by the irradiation of the laser beam (L) is a step of forming the end face (210) and the inclined surface (101) by machining.

Although the embodiment of the invention has been described, the invention according to claims is not to be limited to the above-mentioned embodiment. Further, please note that all combinations of the features described in the embodiment are not necessary to solve the problem of the invention.

In addition, the invention can be appropriately modified and implemented without departing from the gist thereof. For example, although the case where the angle θ of the inclined surface 101 is an obtuse angle has been described in the embodiment, the angle θ may be an acute angle. In this case, electronic components such as the photoelectric conversion element 41, etc., are mounted on the second principal surface 10b side.

In addition, although the case where the back-side metal layer 3 is formed on the second principal surface 10b has been described in the embodiment, the back-side metal layer 3 may not be formed on the second principal surface 10b.

In addition, although the case where one optical fiber housing portion 100 and one optical module structure are formed on the optical board 1 has been described in the embodiment, it is not limited thereto. Plural optical fiber housing portions 100 and optical module structures may be formed on the optical board 1.

In addition, although the first metal layer 21, the second metal layer 22 and the foundation metal layer 31 which are formed of copper (Cu) have been described in the embodiment, it is not limited thereto. The first metal layer 21, the second metal layer 22 and the foundation metal layer 31 may be partially or entirely formed of, e.g., aluminum (Al). In addition, the materials of the respective layers of the wiring pattern 2 and the back-side metal layer 3 are not limited to those mentioned above. The material of the base material 10 is not limited to polyimide and may be, e.g., PET (polyethylene terephthalate).

In addition, although the end face 210 and the inclined surface 101 are formed by obliquely irradiating the laser beam L onto the surface 21a of the first metal layer 21 in the embodiment, it is not limited thereto. The end face 210 and the inclined surface 101 may be formed by irradiating the laser beam L onto the surface 21a of the first metal layer 21 using a shadow mask of which permeability to the laser beam L is adjusted in accordance with a depth (a vertical distance) of the end face 210 and the inclined surface 101 to be formed from the surface 21a of the first metal layer 21. In other words, using the shadow mask can eliminate the necessity of irradiating the laser beam L at an angle inclined with respect to the surface 21a, which facilitates the formation of the end face 210 and the inclined surface 101.

In addition, although the end face 210 and the inclined surface 101 are formed by obliquely irradiating the laser beam L onto the surface 21a of the first metal layer 21 in the embodiment, it is not limited thereto. The end face 210 and the inclined surface 101 may be formed by machining such as dicing. The machining allows the end face 210 and the inclined surface 101 to be formed at lower cost than the processing by a laser beam.

What is claimed is:

1. An optical board, comprising:
   a plate-shaped resin base material comprising a slit-shaped optical fiber housing portion formed thereon;
   a metal layer formed on a surface of the based material; and
   a reflective layer for reflecting light propagating in an optical fiber housed in the optical fiber housing portion,
   wherein the base material further comprises an inclined surface inclined with respect to the surface of the base material at a terminal end of the optical fiber housing portion, and
   wherein the reflective layer is formed over an end face of the metal layer and the inclined surface, the end face forming a flat surface continuously with the inclined surface.

2. The optical board according to claim 1, wherein the optical fiber housing portion is formed by irradiating a laser beam from the metal layer side at an angle corresponding to an inclination angle of the inclined surface with respect to the surface of the base material.

3. The optical board according to claim 1, wherein an outermost surface of the reflective layer is plated with gold (Au).

4. The optical board according to claim 1, further comprising: a wiring pattern comprising a metal and formed on the surface; and a back-side metal layer formed on a back surface of the base material, wherein the wiring pattern and the back-side metal layer are electrically connected to each other through the reflective layer.

5. The optical board according to claim 1, wherein the optical fiber is fixed inside the optical fiber housing portion by a solder.

6. An optical module structure, comprising: the optical board according to claim 1; and a photoelectric conversion element for conversion between an electrical signal and an optical signal transmitted through the optical fiber as a transmission medium.

7. A method of manufacturing an optical board, comprising:
   forming a first metal layer on a surface of a plate-shaped resin base material;
   removing a portion of the base material together with the first metal layer on the surface thereof so as to form a slit-shaped optical fiber housing portion on the base material and an inclined surface at a terminal end of said optical fiber housing portion by irradiating a laser beam onto the surface of the base material; and
   forming a reflective layer on an end face of the first metal layer and the inclined surface.

8. The method according to claim 7, further comprising: forming a second metal layer on the first metal layer and the inclined surface after the removing the portion of the base material; and forming a wiring pattern on the surface by partially etching the first and second metal layers.

9. The method according to claim 7, wherein the removing of portion of the base material is conducted by irradiating the laser beam at an angle inclined with respect to the surface of the base material.

10. The method according to claim 7, wherein the removing of the portion of the base material is conducted by irradiating the laser beam vertically with respect to the surface of the base material using a shadow mask with an adjusted permeability to the laser beam.

11. A method of manufacturing an optical board, comprising:
   forming a first metal layer on a surface of a plate-shaped resin base material;
   removing a portion of the base material together with the first metal layer on the surface thereof so as to form a slit-shaped optical fiber housing portion on the base material and an inclined surface at a terminal end of the optical fiber housing portion; and
   forming a reflective layer on an end face of the first metal layer and the inclined surface,
   wherein the removing of the portion of the base material is conducted by dicing.

12. The optical board according to claim 1, wherein the slit-shaped optical fiber housing portion formed in the plate-shaped resin base material has a flat bottom wall that is coplanar with the surface of the base material.

13. The optical board according to claim 1, wherein the thickness of the optical board is ±20% of the diameter of the optical fiber.

14. The optical board according to claim 1, wherein the metal layer formed on the entire surface of the base material.

* * * * *